(12) United States Patent
Johnson

(10) Patent No.: US 8,250,906 B2
(45) Date of Patent: Aug. 28, 2012

(54) LEAK DETECTOR

(75) Inventor: Dwight N. Johnson, Carlsbad, CA (US)

(73) Assignee: Sloan Valve Company, Franklin Park, IL (US)

( * ) Notice: Subject to any disclaimer, the term of this patent is extended or adjusted under 35 U.S.C. 154(b) by 806 days.

(21) Appl. No.: 12/253,745

(22) Filed: Oct. 17, 2008

(65) Prior Publication Data

US 2010/0095744 A1 Apr. 22, 2010

(51) Int. Cl.
*G01M 3/04* (2006.01)
(52) U.S. Cl. .......................................................... 73/40
(58) Field of Classification Search ......................... None
See application file for complete search history.

(56) References Cited

U.S. PATENT DOCUMENTS

| | | | |
|---|---|---|---|
| 1,306,154 A | 6/1919 | Leitman | |
| 4,096,747 A | 6/1978 | Gilson | |
| 4,513,184 A | 4/1985 | Hughes | |
| 5,002,090 A | 3/1991 | Ichikawa et al. | |
| 5,261,442 A * | 11/1993 | Kingsford et al. | 137/312 |
| 6,239,708 B1 | 5/2001 | Young | |
| 6,333,695 B2 | 12/2001 | Young | |
| 6,528,748 B2 | 3/2003 | Harris et al. | |
| 6,741,179 B2 | 5/2004 | Young | |
| 6,914,531 B1 | 7/2005 | Young | |
| 7,221,281 B1 | 5/2007 | Young | |

* cited by examiner

*Primary Examiner* — Peter Macchiarolo
*Assistant Examiner* — Alex Devito
(74) *Attorney, Agent, or Firm* — Greer, Burns & Crain, Ltd.

(57) ABSTRACT

A leak detector for use with a piping system, where the leak detector includes a housing configured to be attached to a conduit and a valve configured and arranged for axial movement with respect to the housing. Additionally, there is a magnet attached to the valve for movement therewith. Embodiments of the invention also preferably include a magnetically-actuated switch positioned within the leak detector along an axial flow path of a fluid such that axial movement of the magnet triggers the switch, which indicates fluid flow through the leak detector. In certain embodiments, there is also a leak passageway that permits a relatively small amount of fluid to pass to an outlet side of the valve even when a diaphragm is in seating contact with the valve if fluid pressure on the outlet side of the valve is slightly lower than fluid pressure on an inlet side of the valve.

17 Claims, 8 Drawing Sheets

LEAK DETECTOR

The present invention relates generally to a flow monitoring device that is able to detect leakage through a component positioned downstream thereof. More particularly, preferred embodiments of the present invention relate to a leak detector that is able to detect even a small amount of leakage through a component positioned on the outlet side thereof, such as leakage through a closed valve of any of a variety of types, such as, for example, a flush valve of a urinal or toilet, or the on/off valve of a faucet, among other types.

BRIEF SUMMARY OF THE INVENTION

One of the features of embodiments of the present leak detector is that it can detect a relatively small flow rate, such as caused by a leak in a downstream component. Such leakage can be in the range of fractions of a gallon per minute (or cubic centimeters per minute). In comparison, many existing flow monitors have a "turn-down" limitation of 10:1, which means, for example, that a meter capable of measuring a 25 gallon per minute flow rate will lose accuracy, or possibly stop operating, at flow rates under approximately 2.5 gallons per minute. In embodiments of the present invention, there is a leak passageway, such as a small groove in the seating portion of the valve, which allows for the pressure to be balanced between the inlet side of the valve and the outlet side, without opening the valve. Such a leak passageway is one of the ways in which embodiments of the present invention can be used in a monitor that detects very low flow rates.

More specifically, certain embodiments of the present leak detector include a housing configured to be attached to a conduit, a valve configured and arranged for axial movement within the housing, and an annular diaphragm including an outer circumferential portion sealingly connected to the housing. Such a leak detector also preferably includes a biasing member operatively connected to the diaphragm, wherein the biasing member biases an inner circumferential portion of the diaphragm into seating contact with the seating surface of said valve. Additionally, the leak detector also preferably includes a leak passageway that permits a relatively small amount of fluid to pass to the outlet side of the valve when the inner circumferential portion of the diaphragm is in seating contact with the outlet side of said valve and when the fluid pressure on said outlet side of said valve is slightly lower than fluid pressure on an inlet side of the valve. Finally, the leak detector also preferably includes components configured such that axial movement within the leak detector activates a switch to indicate fluid flow.

Additionally, embodiments of the present leak detector may include a housing configured to be attached to a conduit, a guide movably seated within the housing, wherein the guide includes a plurality of axially extending ports, and a ribbed valve that includes a plurality of radial ribs that are configured and arranged to extend into the axially extending ports of said guide, where the ribbed valve also includes an axially extending projection. Such embodiments also include a diaphragm plate with an aperture that slidably receives the axially extending projection of said ribbed valve, and a biasing member that is seated within the leak detector, with the biasing member being operatively connected to an outlet side of the diaphragm plate to provide a biasing force thereto. There is also an annular diaphragm seated upon an inlet side of the diaphragm plate, wherein an outer circumferential portion of the diaphragm is sealingly connected to the housing, and an inner circumferential portion of the diaphragm contacts an outlet side of the ribbed valve in a no-flow state. In contrast, during a full-flow state, the inner circumferential portion of the diaphragm is separated from the outlet side of the ribbed valve. Further, axial movement within the leak detector activates a switch to indicate fluid flow.

Moreover, embodiments of the present leak detector can include a housing configured to be attached to a conduit, and a valve positioned within the housing, where the valve is configured and arranged for axial movement with respect to the housing. These embodiments can also include a magnet attached to the valve for movement therewith, and a magnetically-actuated switch positioned within the leak detector along an axial flow path of a fluid such that axial movement of the magnet triggers the magnetically-actuated switch, wherein actuation of the magnetically-actuated switch indicates fluid flow through the leak detector.

BRIEF DESCRIPTION OF THE SEVERAL VIEWS OF THE DRAWINGS

Preferred embodiments of the present invention are described herein with reference to the drawings wherein.

DETAILED DESCRIPTION OF THE INVENTION

Figure 1:
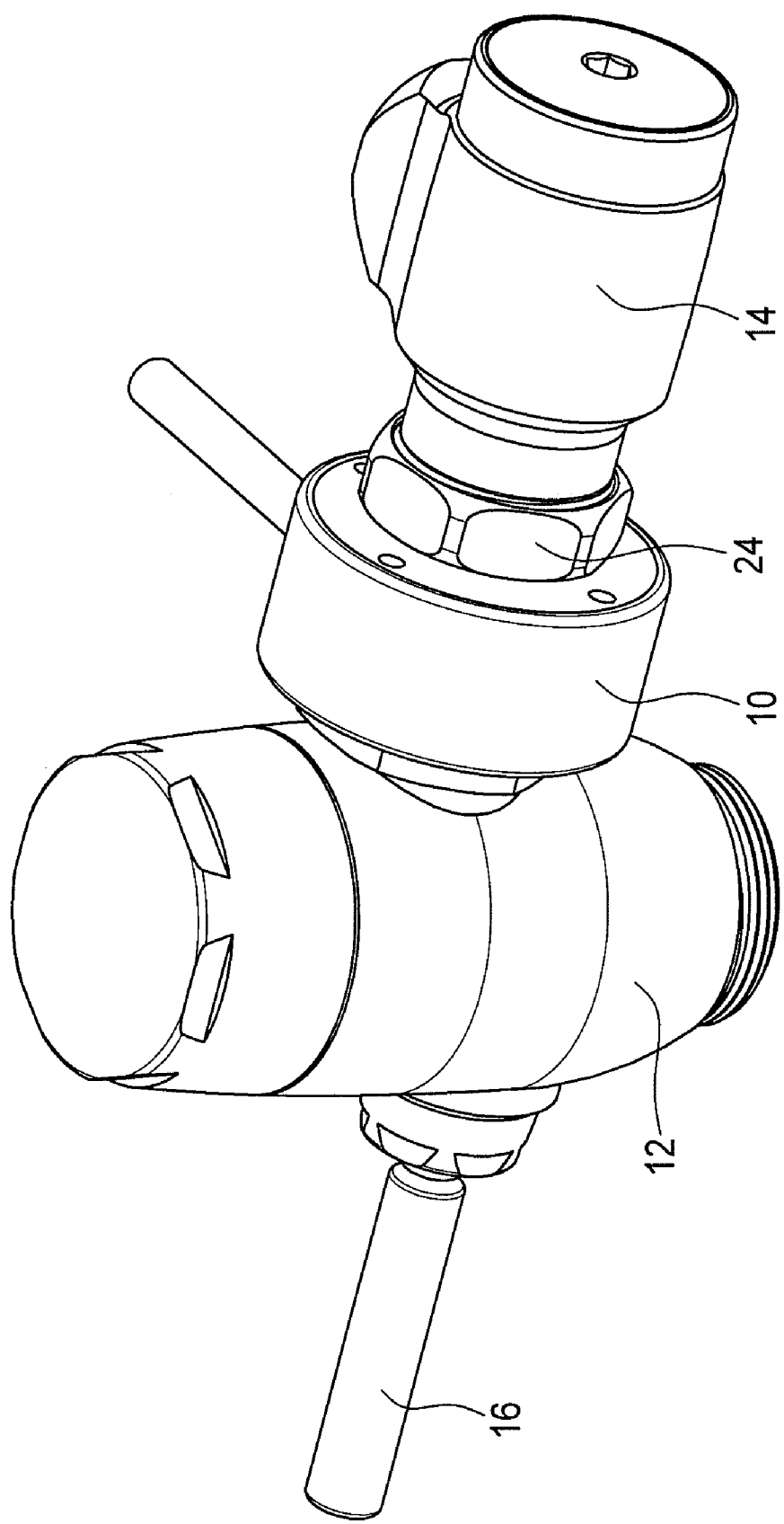
FIG. 1 is a perspective view of one embodiment of the present leak detector, shown as a part of a piping system that includes a urinal flush valve and a pipe conduit.

Turning now to the drawings, preferred embodiments of the present leak detector will be shown and described. FIG. 1 is a perspective view of one embodiment of a leak detector 10, shown positioned between a flush valve 12 and a piping conduit 14, which conduit is attached to the water supply within a residence or commercial building. Although the flush valve 12 as shown is part of a urinal or commercial water closet, the present leak detector 10 may be used in other piping systems, such as with other types of flush valves or even with faucet valves. As known in the art, flush valve 12 includes a handle 16 that is depressed when flushing of the associated urinal/toilet (not shown) is desired, which action opens flush valve 12 to permit a predetermined volume of water to pass through the flush valve 12. Flush valve 12 is normally in a closed state, whereby no water is allowed to pass through valve 12, if valve 12 is operating properly. However, valves such as flush valve 12 may malfunction, for any of a variety of different reasons, and such a malfunctioning valve may permit some unintended water leakage to pass therethrough. One of the benefits of embodiments of the present invention is that it can detect such leakage, even in relatively small amounts (such as leakage rates in the range of several cubic centimeters per minute), and alert the user of such leakage so that valve repair or other suitable action can be taken.

Figure 2:
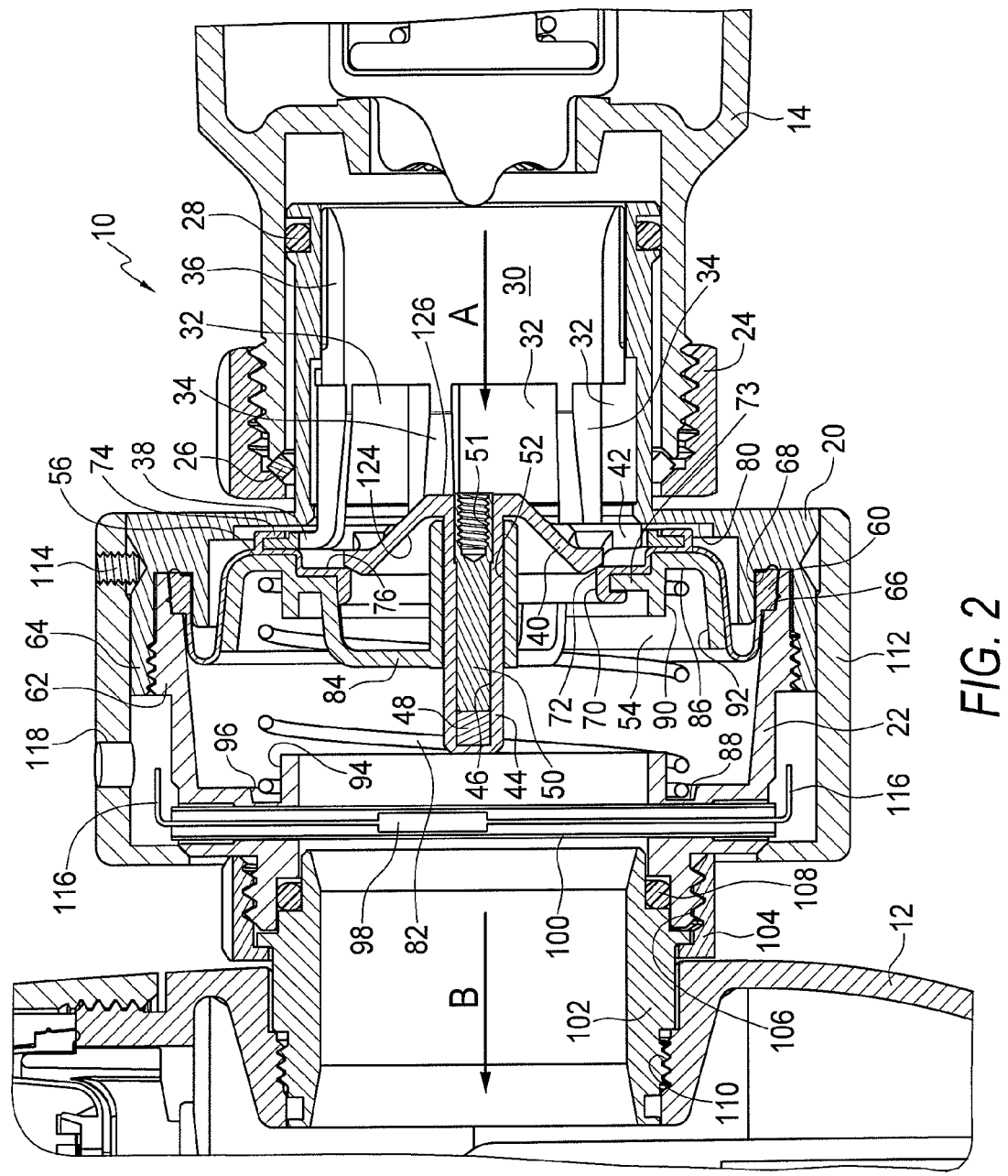
FIG. 2 is a cross-sectional view of an embodiment of the present leak detector.
Figure 3:
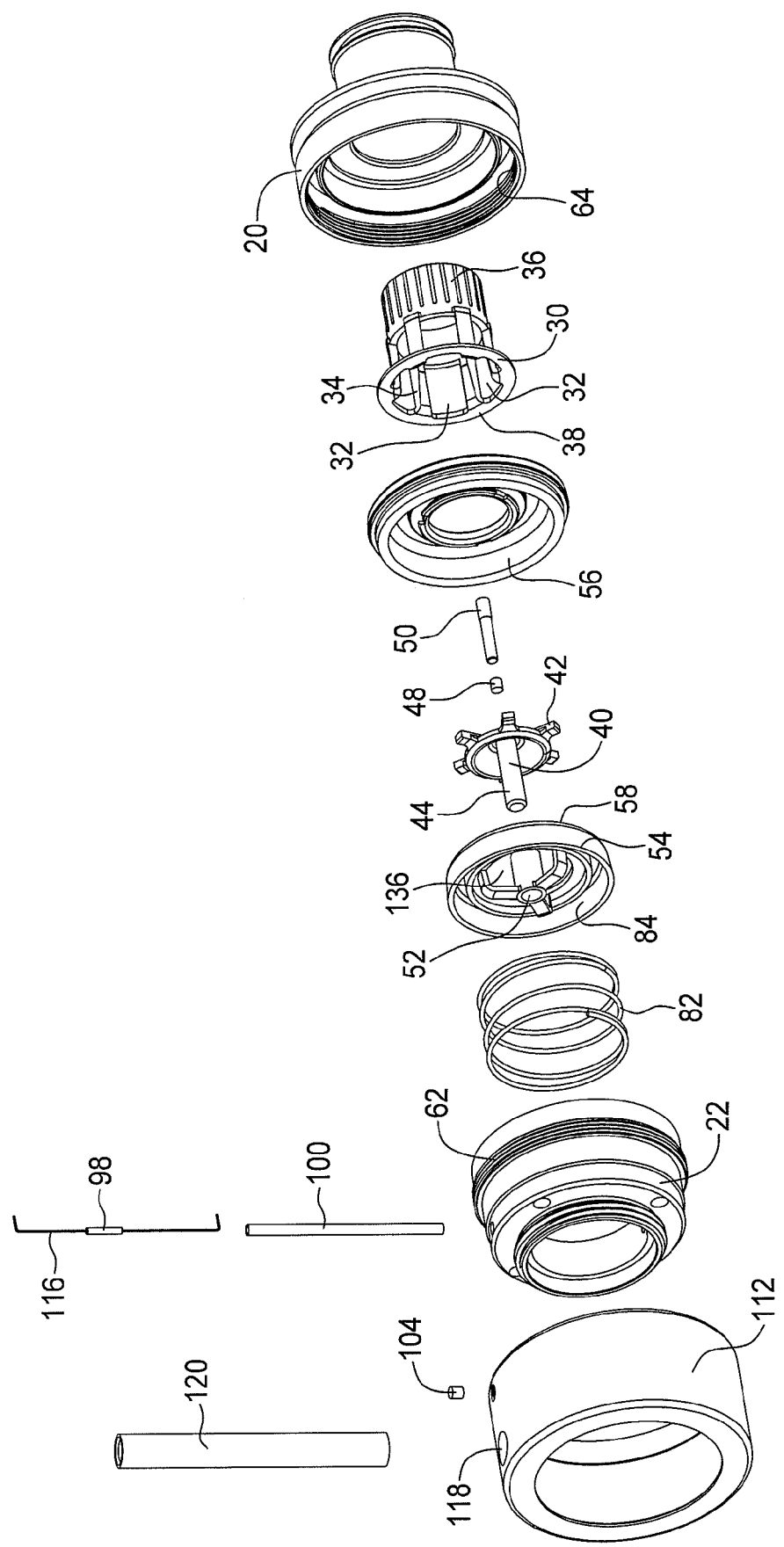
FIG. 3 is an exploded view of the leak detector of FIG. 2.

Turning now to FIGS. 2 and 3, the components of one embodiment of the present leak detector are shown and will be described, where FIG. 2 is a cross-sectional view of leak detector 10 of FIG. 1, and FIG. 3 is an exploded view of leak detector 10, shown without any adjacent valves or conduit. Leak detector 10 includes a housing that is preferably divided into an inlet housing 20 and an outlet housing 22, where the fluid inlet flow into inlet housing 20 is represented by arrow A and the fluid outlet flow out of outlet housing 22 is represented by arrow B. Inlet housing 20 may be connected to the outlet end of a conduit, such as conduit 14, by any known means, such as with a locking threaded sleeve 24 which has internal threads that mate with corresponding external threads on conduit 14.

To ensure fluid tight sealing between inlet housing 20, conduit 14, and threaded sleeve 24, one or more elastomeric sealing rings, such as rings 26 and 28, may be employed, such as shown in FIG. 2. Of course, different types of sealing means, different positioning of sealing rings, or even a completely different type of sealing system may also be employed, if desired.

As shown in FIG. 2, a guide 30 is movably seated within the inlet housing 20, whereby guide 30 is configured and arranged for limited axial movement within inlet housing 20, as described in more detail hereinbelow. As shown in FIGS. 2 and 3, guide 30 preferably includes a plurality of axially extending ports 32, which are defined between axially extending legs 34. The legs 34 of guide 30 extend in the axial direction between inlet sleeve portion 36 and an annular flange portion 38, which, in the embodiment shown, is an annular flange that extends radially outwardly in an approximately normal direction to the axial direction. It is contemplated that other flange designs may also be employed. Further, although in the embodiment shown legs 34 divide the relevant portion of guide 30 into six axially extending ports 32, a different number of legs/ports may be employed, if desired, depending upon the conditions of use.

Seated radially inwardly of guide member 30, towards its outlet end portion, is a valve 40 that preferably includes a plurality of radial ribs 42 that are configured and arranged to extend into the axially extending ports 32 of the guide 30. Accordingly, the number of radial ribs 42 of ribbed valve 40 preferably matches the number of ports 32. However, it is also contemplated that the number of ribs can be different from the number of ports, such as including two ribs per port, or only one rib in every other port, as long as the rib/port configuration allows for limited axial movement of the valve within the guide, as described below.

Preferably, the ribbed valve 40 includes an axially extending projection 44 extending from an outlet side 124 thereof. In the preferred embodiment, the projection 44 includes a hollow interior 46 with a magnet 48 secured within the hollow interior by a magnet plug 50, which could include a threaded aperture 51 configured to receive a screw used to radially outwardly expand the inlet end of magnet plug 50 into a securing relationship with hollow interior 46. However, alternate means of associating a magnet with the valve for movement therewith are also contemplated, such as by adhesively adhering a magnet within the hollow interior 46, or even by simply adhering a magnet to the distal exterior end of the projection 44.

The axially extending projection 44 of the ribbed valve 40 is configured and arranged to slide in the axial direction within an aperture 52 located in a diaphragm plate 54. In the preferred embodiment, the aperture 52 is axially elongated to provide a guide surface so that projection 44 is maintained along a straight axial path while sliding within the aperture.

In the embodiment shown in the figures, an annular diaphragm 56 is seated upon an inlet side 58 of the diaphragm plate 54. Preferably, the outer circumferential portion 60 of the diaphragm 56 is sealingly connected to the housing, such as by being pressed between inlet housing 20 and outlet housing 22, as shown in FIG. 2. More specifically, in this embodiment, outlet housing 22 includes externally threaded portion 62 and inlet housing 20 includes an internally threaded portion 64, which cooperate when rotated relative to each other such that the outer circumferential portion 60 of diaphragm 56 is pressed between surface 66 of outlet housing 22 and surface 68 of inlet housing 20. Of course, other means of sealing the outer circumferential portion of the diaphragm to the housing are also contemplated as being within the scope of the invention, regardless of whether the housing is made of a single unitary component, two components (as shown in the figures), or three or more components.

In the preferred embodiment, the guide 30, the diaphragm 56 and the diaphragm plate 54 are all connected to each other to define a compound assembly that moves as a unit. For example, in the embodiment of FIGS. 2 and 3, the diaphragm 56 includes a first lip structure 70 on an inner circumferential portion 72 of the diaphragm 56. Preferably, the first lip structure 70 cooperates with an annular boss 73 on the diaphragm plate 54 to attach the diaphragm 56 to the inlet side of the diaphragm plate 54. The embodiment of FIGS. 2 and 3 also includes a second lip structure 74 on an inlet side of the diaphragm 56. Preferably, the second lip structure 74 cooperates with a flange 38 on the guide 30 to attach the diaphragm 56 and the guide 30 together. Instead of using the lip structures shown, other means of connecting together the guide, diaphragm and diaphragm plate may also be employed, if desired.

Further, the ribbed valve 40 is preferably contained within the compound assembly defined by the guide 30, the diaphragm 56 and the diaphragm plate 58, such that axial movement of the ribbed valve 40 is limited within the compound assembly. More specifically, as can be seen in FIG. 2, the radial ribs 42 of the ribbed valve 40 extend through the axially extending ports 32 of the guide 30 and contact a shoulder portion 80 of inlet housing 20, thereby limiting axial movement of the ribbed valve 40 in the direction toward the inlet side of the leak detector 10.

Additionally, axial movement of the ribbed valve 40 in the other direction (i.e., the direction toward the outlet side of the leak detector) is limited by either a component of the compound assembly or by a component rigidly associated with the housing, depending upon the pressure differential between the inlet side and the outlet side of the ribbed valve 40. Although more details of this feature will be described below when describing the operation of the leak detector, briefly, axial movement of the ribbed valve 40 towards the outlet side is limited by contact with either the diaphragm 56 and diaphragm plate 54, such as shown in the no-flow state of FIG. 6, or by contact with a switch tube 100, which switch tube is rigidly connected to outlet housing 22, such as shown in the micro-flow state of FIG. 7.

FIGS. 2 and 3 show how the leak detector 10 includes a biasing member, such as a spring 82. The spring 82, or other biasing member, creates a light biasing force that causes the inner circumferential portion 72 of diaphragm 56 to bear directly against the seating area of ribbed valve 40. In one example of the embodiment shown, the spring 82 creates a light pressure differential of less than 1 psi as the diaphragm is initially stoked. In the embodiment shown, spring 82 is operatively connected on one end to the outlet side 84 of the diaphragm plate 54, where spring 82 provides a biasing force on the diaphragm plate, and its associated components, towards the inlet side of the leak detector. On its other end, spring 82 is operatively connected to a fixed component, such as outlet housing 22. In the embodiment shown, one end of spring 82 is seated on an annular ledge portion 86 of diaphragm plate 54, and the other end of spring 82 is seated on an annular ledge portion 88 of outlet housing 22.

Preferably, spring 82 is maintained in position in the radial direction by a plurality of inner and outer collars formed on both the diaphragm plate and the housing, although such collars may be omitted, if desired. More specifically, as can be seen in FIG. 2, the shown embodiment of diaphragm plate 54 includes inner spring collar 90 and outer spring collar 92, and the shown embodiment of outlet housing 22 includes inner spring collar 94 and outer spring collar 96.

The leak detector of the present invention also includes some form of switch that is activated to indicate flow through the device. In the preferred embodiment shown in the figures, the switch is a magnetically-actuated switch 98, such as a readily available reed switch, that is positioned within the leak detector 10 such that axial movement of the magnet 48 triggers the switch 98 when the magnet is within a certain distance from the switch, as explained more fully below when describing the operation of the device. In order to prevent the fluid from damaging the magnetically-actuated switch 98, the switch is preferably positioned within a tube 100 that is rigidly secured to a portion of the housing. In this embodiment, tube 100 is secured to outlet housing 22 such that the tube isolates the magnetically-actuated switch 98 from the fluid flowing through the leak detector. As can be seen in FIG. 2, in this embodiment, tube 100 extends in a generally radial direction within outlet housing 22.

The outlet end of outlet housing 22 is configured to be attached to another component, such as outlet conduit 102 of FIG. 2. Such connection may be accomplished in any known manner, such as by using collar 104, cooperating threaded portions 106 and elastomeric sealing ring 108. If leak detector 10 is being used in a piping system such as that shown in FIG. 1 that includes a flush valve, the outlet conduit 102 may be attached to the inlet portion of flush valve 12 in any known manner, such as, for example, by using the cooperating threaded portions 110 shown in FIG. 2.

Further, in order to improve the exterior appearance of the leak detector, a cover 112 may optionally be positioned around both the inlet housing 20 and the outlet housing 22, as shown in FIG. 2. One means of maintaining the cover 112 in position is to employ a set screw 114. Additionally, in the embodiment shown, magnetically-actuated switch 98 includes a wire 116 that is connected to some form of display (not shown) or alarm (not shown) for alerting the user when the leak detector detects flow. Accordingly, the cover 112 preferably includes an aperture 118 for receiving a wire pipe 120, where the wire pipe provides a conduit that protects wire 116 as it passes from the switch to the display or alarm.

Figure 4:
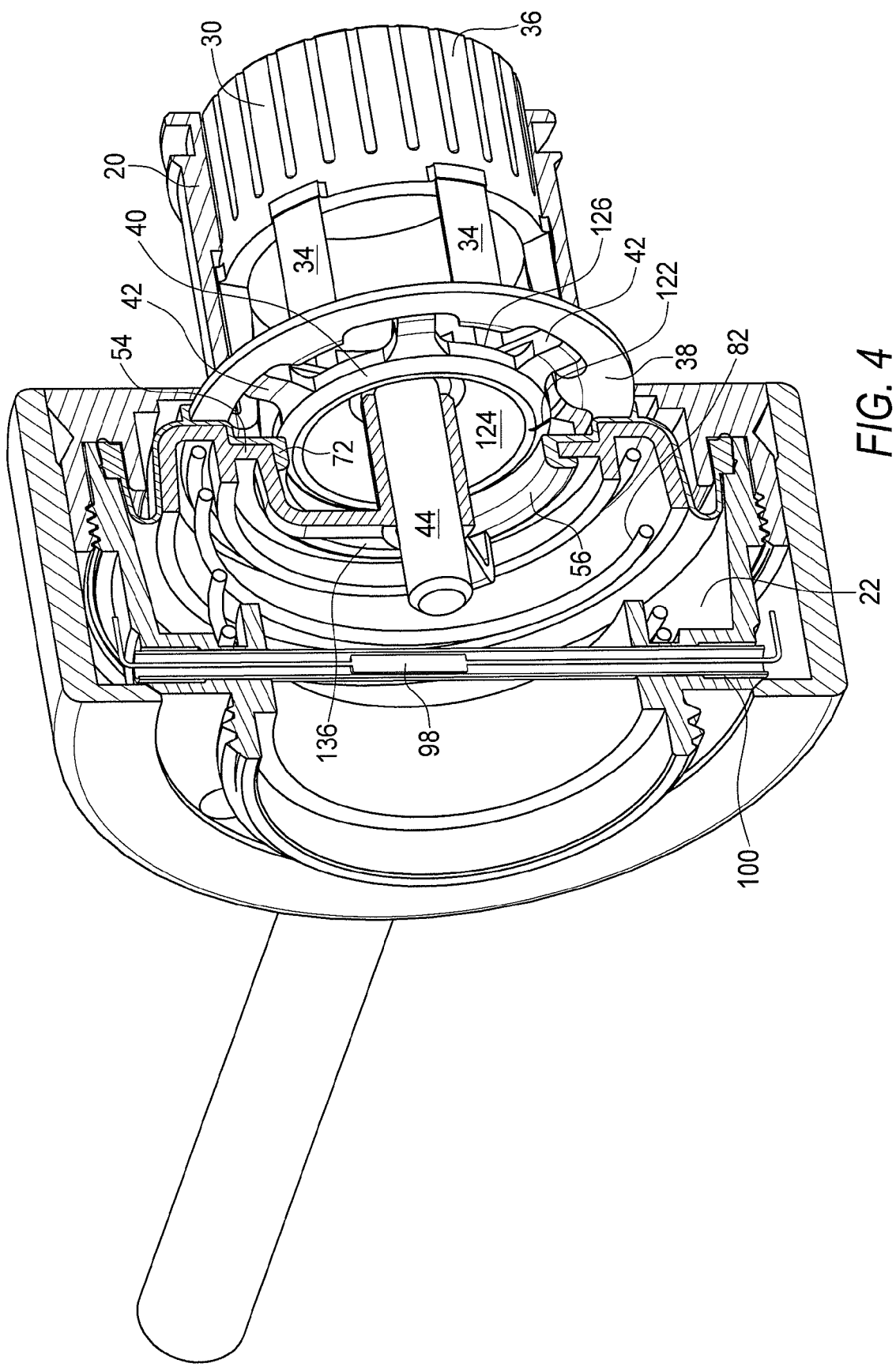
FIG. 4 is a partially cut-away perspective view of the leak detector of FIG. 2.
Figure 5:
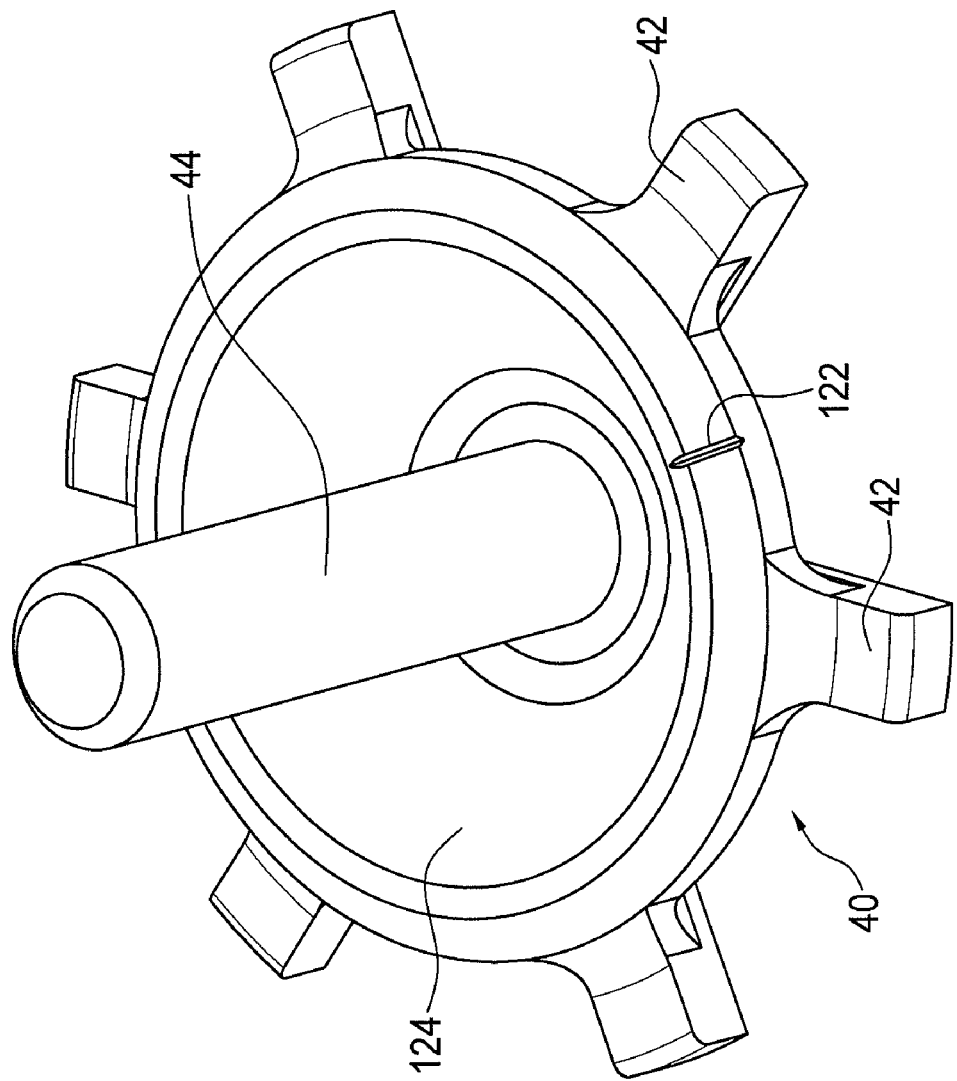
FIG. 5 is a perspective view of one embodiment of a valve that can be used within the present leak detector.

In situations where the leak detector is intended to detect very low flow rates, such as those on the order of several cubic centimeters per minute, which will be referred to herein as a "micro" flow, the ribbed valve 40 can include a leak passageway 122, such as shown in FIGS. 4 and 5. Leak passageway 122, which may be in the form of the groove shown in FIGS. 4 and 5, permits a relatively small amount of fluid to pass between the interface of the diaphragm 56 and the ribbed valve 40 when inner circumferential portion 72 of the diaphragm 56 is in contact with the outlet side 124 of the ribbed valve 40 and when the pressure on the outlet side 124 of the ribbed valve 40 is slightly lower than the pressure on an inlet side 126 of the ribbed valve 40, as explained more fully below when the operation of the monitor is described. Preferably, groove 122 is of a generally v-shaped cross-section. However, other cross-sections, such as u-shaped, rectangular, square, etc., are also contemplated. Although groove 122 is relatively narrow, it is self-cleaning because one side of the groove is open when not seated against the diaphragm 56 (such as shown in the full-flow state of FIG. 8), which allows the passing fluid to clean any debris from the groove.

Although the embodiment shown and described includes a leak passageway in the form of the groove 122 on a seating surface of the ribbed valve 40, other ways of accomplishing the same result (allowing a small amount of fluid to pass the diaphragm in the micro-flow state) are also contemplated as being within the scope of the invention. For example, it is contemplated that one or more pin holes may be included in the diaphragm or the ribbed valve to allow a small amount of fluid to pass from the inlet side to the outlet side in the micro-flow state, thereby equalizing the pressure on both sides of the valve, without opening the valve, during the micro-flow state.

Figure 6:
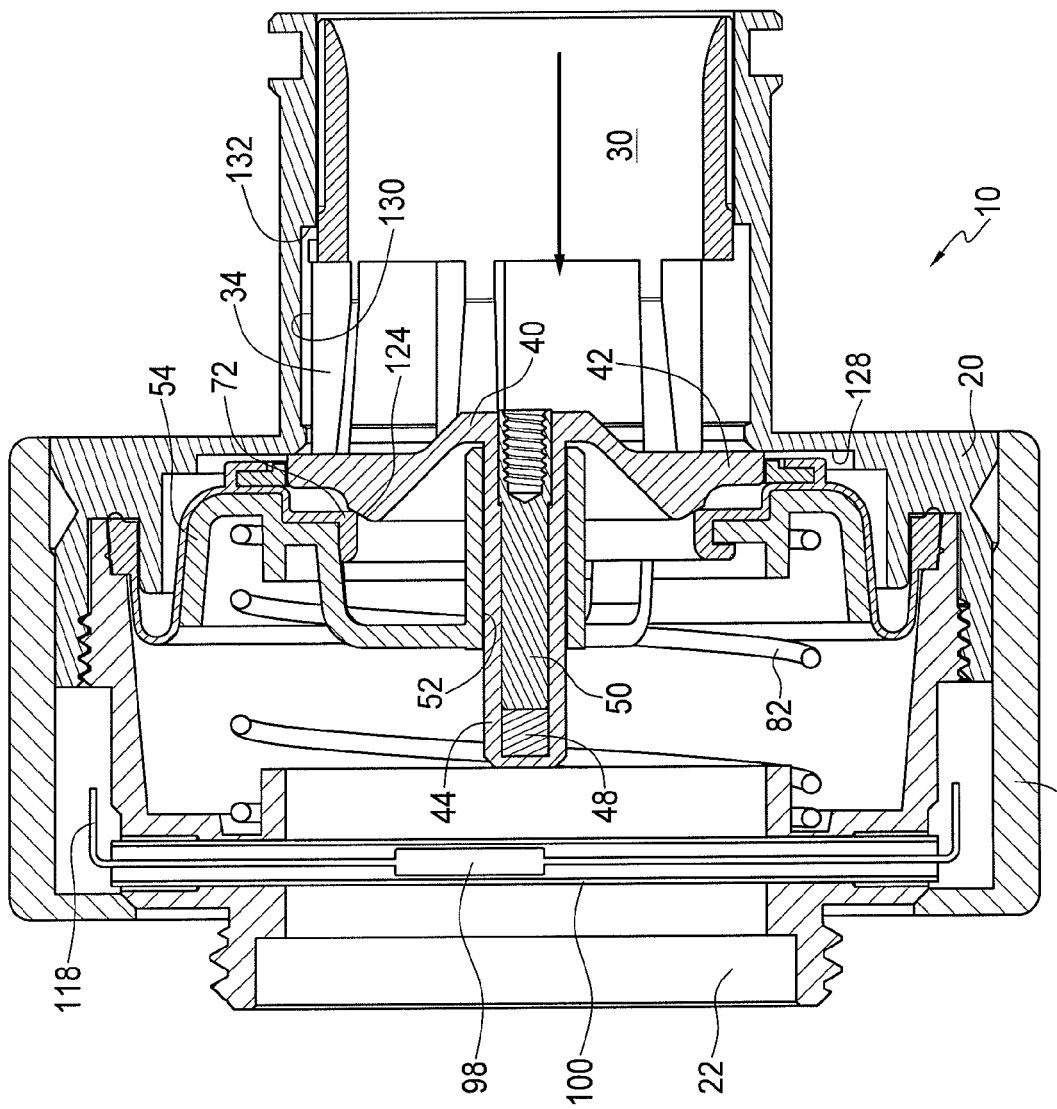
FIG. 6 is a cross-sectional view of the leak detector of FIG. 2, shown in a no-flow state.
Figure 7:
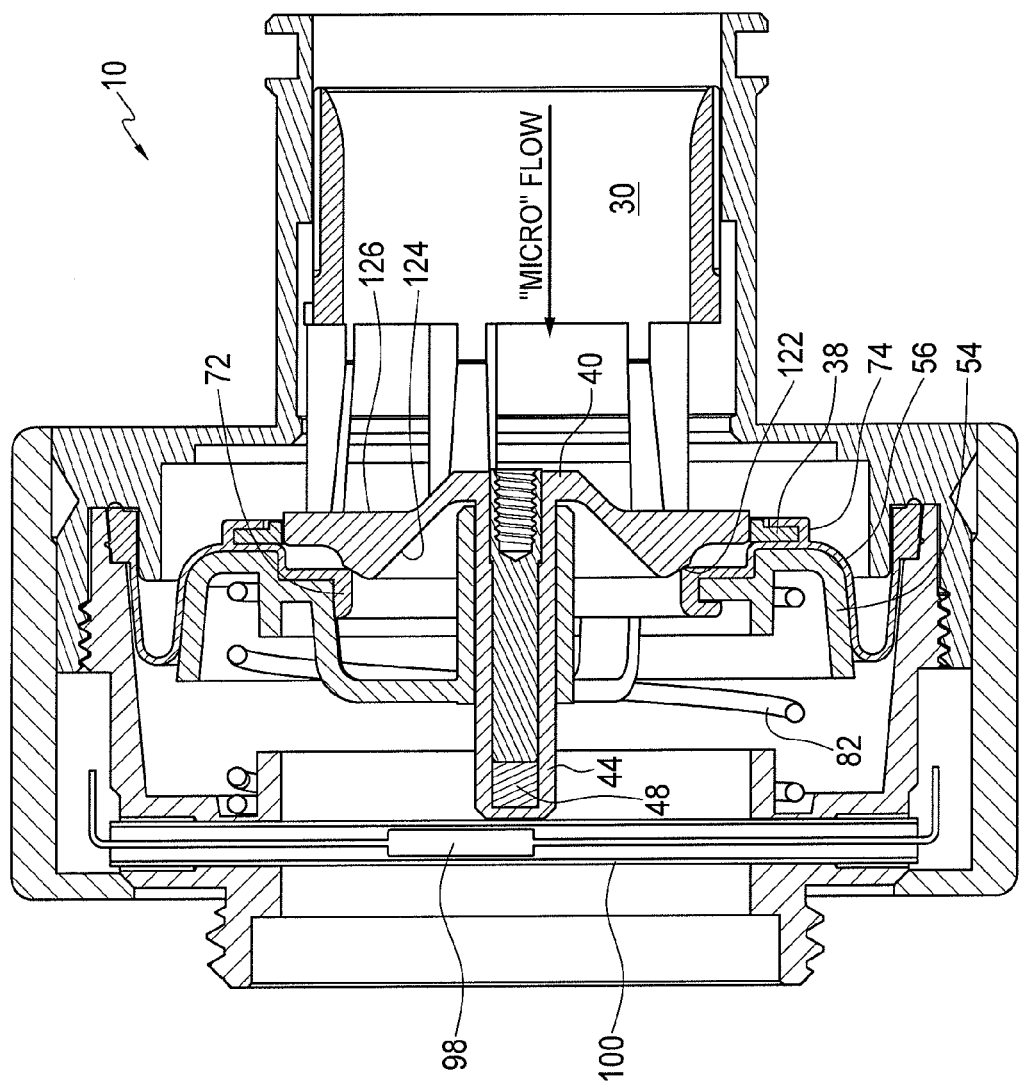
FIG. 7 is a cross-sectional view of the leak detector of FIG. 2, shown in a micro-flow state.
Figure 8:
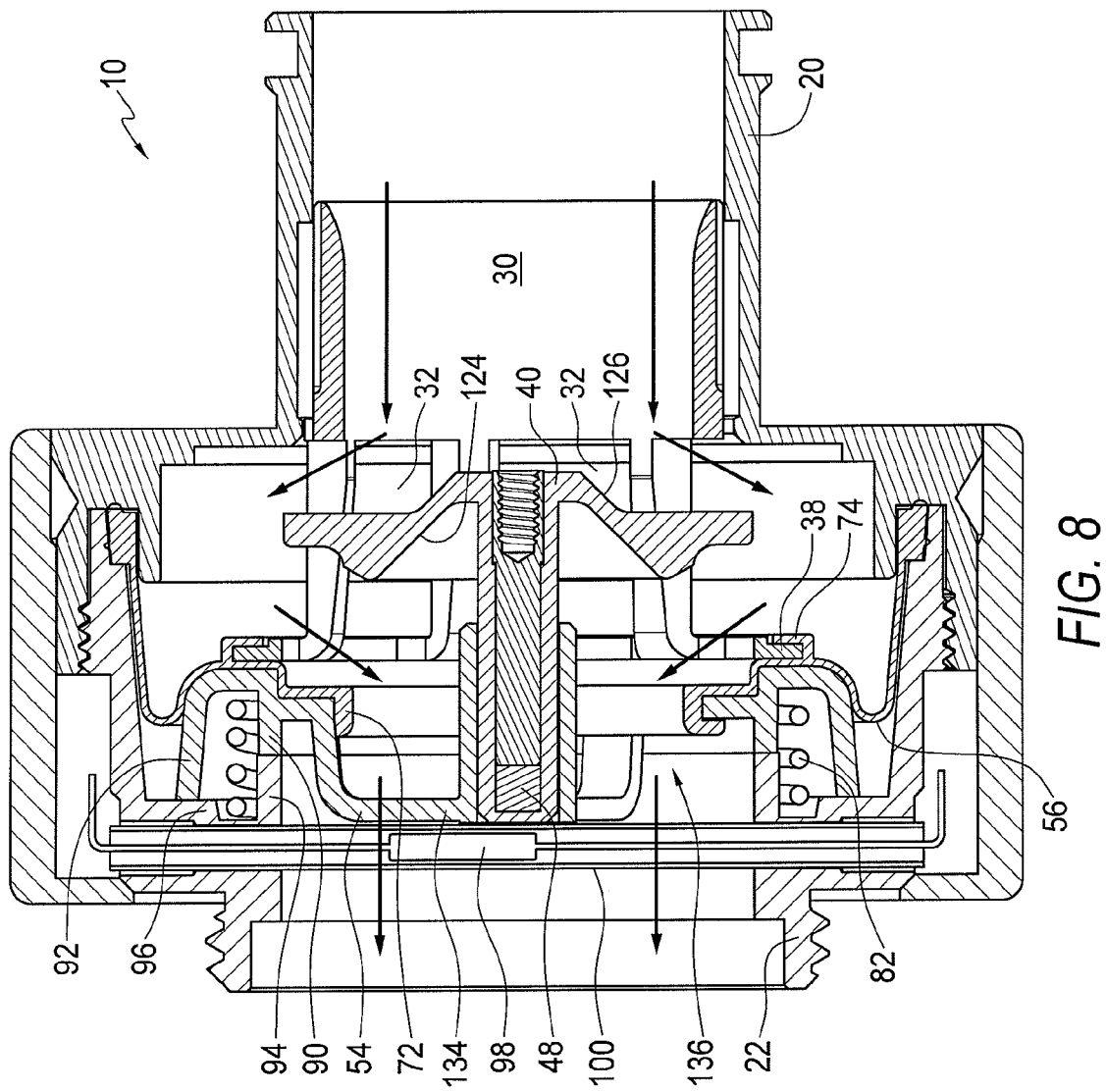
FIG. 8 is a cross-sectional view of the leak detector of FIG. 2, shown in a full-flow state.

Turning now to FIGS. 6-8, the operation of the leak detector of the present invention will be described, where FIG. 6 shows the leak detector 10 in the no-flow state, FIG. 7 shows the leak detector in the micro-flow state and FIG. 8 shows the leak detector in the full-flow state.

In the no-flow state shown in FIG. 6, no fluid is flowing through the monitor, and accordingly the pressure on the inlet side is approximately equal to the pressure on the outlet side. In the no-flow state, although there is approximately no fluid pressure differential between the inlet side of the ribbed valve 40 and the outlet side of said ribbed valve, there is a slight force acting on the diaphragm plate 54 in the direction towards the inlet side created by the biasing member, which in this embodiment consists of spring 82. In the preferred embodiment, the biasing force of the biasing member creates a pressure differential of less than 1 psi. However, other pressure differentials are also contemplated for other uses of the leak detector.

The biasing force of the spring 82 pushes the diaphragm plate 54, the annular diaphragm 56, the ribbed valve 40 and the guide 30 in a first direction (toward the inlet side of the leak detector) to a first limit point where contact between a shoulder 128 on the inlet housing 20 and the ribs 42 of the ribbed valve 40 limits further axial movement. In this state, the diaphragm 56 and the ribbed valve 40 are in seating contact with each other. More specifically, the inner circumferential portion 72 of the diaphragm 56 contacts the outer circumferential portion of the outlet side 124 of the ribbed valve 40. In the no-flow state, guide 30 is also located in a position closest to the inlet side, as shown in FIG. 6. As an axial stop for the guide 30, each axial extending leg 34 may optionally include a projecting portion 130 that is configured to make contact with annular recess 132 of inlet housing 20.

As can be seen in the no-flow state of FIG. 6, magnet 48 is located at a suitable distance from magnetically-actuated switch 98 so that the switch is not activated by the magnet. Accordingly, the leak detector indicates a no-flow condition on either the optional display or with the absence of an audio and/or visual alarm electrically connected to the switch.

Turning now to FIG. 7, the micro-flow state will be discussed. Such micro-flow, which can be in the range of several cubic centimeters per minute in the embodiment shown, can be caused when a component downstream from the leak detector 10, such as flush valve 12 (FIG. 1), leaks due to some malfunction. During such a micro-flow state, the fluid pressure on the inlet side 126 of the ribbed valve 40 is slightly higher than the fluid pressure on the outlet side 124 of the ribbed valve 40, thereby creating a slight pressure differential that is enough to partially overcome the biasing force of the spring 82 (or other biasing member). Because the pressure within the outlet pressure region (i.e., on the outlet side 124 of the ribbed valve 40) is slightly less than pressure within the inlet pressure region (i.e., on the inlet side 126 of the ribbed valve 40), fluid is permitted to pass through the leak passageway 122 from the inlet pressure region to the outlet pressure region, even though the seating surface of ribbed valve 40 remains in contact with the inner circumferential surface 72 of the diaphragm 56.

In the micro-flow state shown in FIG. 7, because the seating contact between the diaphragm 56 and the ribbed valve 40 is maintained, as mentioned above, the pressure differential causes the ribbed valve 40 to push the diaphragm 56 and the diaphragm plate 54 in a second direction, which is toward the outlet side of the leak detector (and which is also opposite of the first direction mentioned above). Because the guide 30 is attached to the diaphragm 56 (via guide flange 38 and second diaphragm lip 74), the guide also moves in the same direction toward the outlet side of the leak detector. Movement of the compound assembly (diaphragm 56, diaphragm plate 54 and guide 30) continues until the ribbed valve 40 contained within the compound assembly contacts a stationary component associated with the housing. More specifically, in this embodiment, such movement stops when the projection 44 of the ribbed valve 40 contacts tube 100. This position of the ribbed valve 40 (shown in FIG. 7) will be defined as the second limit point. Further, the locations of the diaphragm plate 54, the diaphragm 56 and the guide 30 shown in FIG. 7 will be defined as being at an intermediate point.

As can be seen in FIG. 7, the magnet 48 located in projection 44 of the ribbed valve 40 is close enough to the magnetically-actuated switch 98 to activate it, thereby indicating that the leak detector has detected a flow condition. As mentioned above, switch 98 can be connected to a display or an alarm, which would visually and/or audibly indicate to an operator that there is a flow condition.

Turning now to FIG. 8, the full-flow state will be discussed. The full-flow state occurs when a component downstream of the leak detector 10, such as flush valve 12 (FIG. 1) is opened, such as during a normal flushing operation. During the full-flow state, the fluid pressure on the inlet side 126 of the ribbed valve 40 and the inlet side of the diaphragm 56 is significantly higher than the fluid pressure on the outlet side 124 of the ribbed valve and the outlet side of the diaphragm 56 (due to the pressure drop on the outlet side caused by the open downstream valve). Accordingly, the pressure difference in the full-flow state is much greater than the pressure difference in the micro-flow state. With such a significant pressure difference that occurs in the full-flow state, the pressure differential is great enough to completely overcome the biasing force of the spring 82 (or other biasing member). Therefore, the higher pressure on the inlet side is able to move the diaphragm 56 and the diaphragm plate 54 towards the second direction (i.e., towards the outlet side of the leak detector 10) from the intermediate point of FIG. 7 to a second limit point, as shown in FIG. 8. Further axial movement of the diaphragm plate 54 is limited by contact with a stationary component rigidly associated with the housing. In the embodiment shown, the limiting contact is one or more of the following: (a) contact between central portion 134 of the diaphragm plate 54 and the tube 100; (b) contact between the diaphragm plate's inner collar 90 and the outlet housing's inner collar 94; and/or (c) contact between the diaphragm plate's outer collar 92 and the outlet housing's outer collar 96.

Since the guide 30 is attached to the diaphragm 56 via guide flange 38 and second diaphragm lip 74, the guide is also moved in the second direction when the diaphragm 56 and diaphragm plate 54 are moved to the second limit point. The location of the ribbed valve 40 does not change between the micro-flow state (FIG. 7) and the full-flow state (FIG. 8) because the ribbed valve is already at its second limit point, where further axial movement towards the outlet side is prevented by contact with tube 100.

As can be seen in FIG. 8, during the full-flow state, there is no longer seating contact between portion 72 of diaphragm 56 and the ribbed valve 40. Accordingly, fluid is free to flow through axially extending ports 32 of guide 30 along the path shown by the arrows in FIG. 8. More specifically, the fluid flows through guide ports 32, around the radial outer periphery of ribbed valve 40, through an area within the inner circumferential portion 72 of diaphragm 56, through diaphragm plate ports 136 (better shown in FIGS. 3 and 4), and finally through outlet housing 22 to the components downstream of the leak detector 10 (such as flush valve 12, shown in FIG. 1). One of the benefits of the configuration of the present leak detector is that it only results in a slight pressure loss as fluid passes from the inlet housing 20 to the outlet housing 22 and to the downstream components.

As can be seen in the full-flow state of FIG. 8, magnet 48 is in close proximity to magnetically-actuated switch 98, thereby activating the switch, causing the leak detector to indicate a flow condition. As mentioned above, the switch can be attached to a display and/or an alarm to alert of the flow condition. In one embodiment, when the operator is alerted of the flow condition (i.e., when the magnetic switch activates the alarm or display), the operator can observe the other conditions of the piping system to determine if the system includes a leak, such as by determining whether or not a downstream flush valve has been opened or not (where a closed flush valve in combination with flow through the leak detector signifies a leak and an open flush valve in combination with flow does not signify a leak). In other embodiments, the switch may be attached to a timing device for detecting the length of time the switch is in the active state, in order to prevent the alarm during normal operation, such as during a normal flush operation if the leak detector is used in the piping system of FIG. 1. For example, the timing device can prevent a flow rate alarm from going off unless the switch is in the on position for longer than two minutes (or whatever time the flush valve is open during a normal flush operation). In such a system, the leak detector will only indicate fluid flow, via an alarm or display, when there is leakage downstream of the leak detector (i.e. during the micro-flow state of FIG. 7), and not during normal operation (i.e. during the no-flow state of FIG. 6 and during the full-flow state of FIG. 8).

As discussed above, when the magnet 48 comes into close proximity with the magnetically-actuated switch 98, the switch is triggered. Thus, the magnet does not need to contact the switch in order for the switch to be triggered. Accordingly, there is a certain distance between the magnet and the switch at which the switch will be triggered, which will be called the trigger distance.

For example, in the configuration shown in the figures, with the particular type of reed switch, magnet and tube utilized, Applicant has determined the switch is activated when there is about 0.060 inches between the projection 44 (which houses magnet 48) and the tube 100 (which houses switch 98), which distance will be called the separation distance (which separation distance is less than the trigger distance because the separation distance equals the trigger distance minus the thickness of the material of the tube and the thickness of the material of the end of the projection, assuming that the magnet and the switch are aligned along the same axial line).

Of course, for magnets of different strengths, for different types of reed switches, and for different materials and thicknesses of tube and the projection, the optimal separation distance will be different because the trigger distance could be different. However, one of the benefits of the configuration of the invention shown in the drawings is that there is some adjustability of the location of the switch so that the optimal trigger distance can be obtained. Such adjustability is found by moving the switch 98 radially within tube 100, which allows for the optimal trigger distance to be obtained, without changing the dimensions of any of the components. Further, simply adjusting the radial location of the switch within the tube also enables the user to compensate for any relevant tolerance errors in the related components (such as the outlet housing, the ribbed valve, etc.). Once the optimal radial location of the location of the switch is determined for a particular leak detector, the switch can be secured within the tube in any desired manner.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A leak detector for use within a piping system, said leak detector comprising:
a housing configured to be attached to a conduit;
a guide movably seated within said housing, wherein said guide includes a plurality of axially extending ports;
a ribbed valve that includes a plurality of radial ribs that are configured and arranged to extend into said axially extending ports of said guide, said ribbed valve also including an axially extending projection;
a diaphragm plate including an aperture that slidably receives said axially extending projection of said ribbed valve;
a biasing member seated within said leak detector, wherein said biasing member is operatively connected to an outlet side of said diaphragm plate and provides a biasing force thereto; and
an annular diaphragm seated upon an inlet side of said diaphragm plate, wherein an outer circumferential portion of said diaphragm is sealingly connected to said housing,
wherein an inner circumferential portion of said diaphragm contacts an outlet side of said ribbed valve in a no-flow state and said inner circumferential portion of said diaphragm is separated from the outlet side of said ribbed valve in a full-flow state, and
further wherein axial movement within said leak detector activates a switch to indicate fluid flow.

2. The leak detector according to claim 1, wherein:
said guide is connected to an inlet side of said diaphragm; and
an outlet side of said diaphragm is connected to said inlet side of said diaphragm plate,
whereby said guide, said diaphragm and said diaphragm plate move together and define a compound assembly, and
wherein said ribbed valve is contained within said compound assembly.

3. The leak detector according to claim 2, wherein:
said ribbed valve is configured and arranged for limited axial movement within said compound assembly, such that:
axial movement of said ribbed valve in a direction toward an inlet side is limited by said housing, and
axial movement of said ribbed valve in a direction toward an outlet side is limited by either said compound assembly or a component rigidly associated with said housing, depending upon a pressure differential between the inlet side and the outlet side of said ribbed valve.

4. The leak detector according to claim 2, further comprising a leak passageway that permits a relatively small amount of fluid to pass between said diaphragm and said ribbed valve when said inner circumferential portion of said diaphragm is in contact with said outlet side of said ribbed valve and when pressure on said outlet side of said ribbed valve is slightly lower than pressure on an inlet side of said ribbed valve.

5. The leak detector according to claim 4, wherein said leak passageway is a groove formed on said ribbed valve at an interface between said ribbed valve and said diaphragm.

6. The leak detector according to claim 2, wherein said diaphragm includes:
a first lip structure on said inner circumferential portion of said diaphragm, wherein said first lip structure cooperates with an annular boss on said diaphragm plate to attach said diaphragm and said diaphragm plate together; and
a second lip structure on said inlet side of said diaphragm, wherein said second lip structure cooperates with a flange on said guide to attach said diaphragm and said guide together.

7. The leak detector according to claim 1, further comprising:
a magnet attached to said axially extending projection of said ribbed valve, and
wherein said switch is a magnetically-actuated switch positioned within said leak detector such that axial movement of said magnet triggers said switch.

8. The leak detector according to claim 1, wherein:
said housing includes an inlet housing portion and an outlet housing portion; and
said outer circumferential portion of said diaphragm creates a seal between said inlet housing and said outlet housing.

9. The leak detector according to claim 1, wherein said biasing member is a spring that extends between an annular ledge portion of said housing and said outlet side of said diaphragm plate.

10. The leak detector according to claim 2, further comprising a leak passageway that permits fluid flow from the inlet side of said ribbed valve to said outlet side, wherein:
during said no-flow state, there is approximately no fluid pressure differential between said inlet side of said ribbed valve and said outlet side of said ribbed valve, whereby said biasing force of said biasing member pushes said diaphragm plate, said annular diaphragm, said ribbed valve and said guide in a first direction to a first limit point when interference between said housing and said ribs of said ribbed valve limits further axial movement, with said diaphragm and said ribbed valve in seating contact with each other;
during a micro-flow state, the fluid pressure on said inlet side of said ribbed valve is slightly higher than the fluid pressure on said outlet side of said ribbed valve, thereby creating a slight pressure differential that is enough to partially overcome said biasing force of said biasing member, whereby although said seating contact between said diaphragm and said ribbed valve is maintained, said ribbed valve pushes said diaphragm, said diaphragm plate and said ribbed valve in a second direction, which is opposite of said first direction, until said ribbed valve reaches a second limit point, with said diaphragm plate, said diaphragm and said ribbed valve being at an intermediate point; and during said full-flow state, the fluid pressure on said inlet side of said ribbed valve is more than slightly higher than the fluid pressure on said outlet side of said ribbed valve, thereby creating a pressure differential that is great enough to completely overcome said biasing force of said biasing member, whereby seating contact between said diaphragm and said ribbed valve ceases because said diaphragm, said diaphragm plate and said guide are moved in said second direction from said intermediate point to a second limit point, while said ribbed valve is maintained at said second limit point.

11. A leak detector for use within a piping system, said leak detector comprising:

a housing configured to be attached to a conduit;

a valve configured and arranged for axial movement within said housing, an annular diaphragm including an outer circumferential portion sealingly connected to said housing;

a biasing member operatively connected to said diaphragm, wherein said biasing member biases an inner circumferential portion of said diaphragm into seating contact with a seating surface of said valve; and a leak passageway that permits a relatively small amount of fluid to pass to an outlet side of said valve when said inner circumferential portion of said diaphragm is in seating contact with said outlet side of said valve and when fluid pressure on said outlet side of said valve is slightly lower than fluid pressure on an inlet side of said valve, wherein axial movement within said leak detector activates a switch to indicate fluid flow.

12. The leak detector according to claim 11, wherein said leak passageway is a groove formed on said seating surface of said valve.

13. The leak detector according to claim 11, wherein:

said switch is activated by axial movement of said valve, and further wherein activation of said switch indicates a flow condition across said leak detector;

wherein an outlet pressure region is defined on an outlet side of said valve, and an inlet pressure region is defined on an inlet side of said valve;

when pressure within said outlet pressure region is approximately equal to pressure within said inlet pressure region, which signifies a no-flow state, said seating surface of said valve contacts said inner circumferential surface of said diaphragm and said valve is positioned to not activate said switch of said flow detector, whereby said flow detector indicates a no-flow condition;

when pressure within said outlet pressure region is significantly less than pressure within said inlet pressure region, which signifies a full-flow state, said seating surface of said valve does not contact said inner circumferential surface of said and said valve is positioned to activate said switch of said flow detector, whereby said flow detector indicates a flow condition; and when pressure within said outlet pressure region is slightly less than pressure within said inlet pressure region, thereby permitting fluid to pass through said leak passageway from said inlet pressure region to said outlet pressure region, even though said seating surface remains in contact with said inner circumferential surface of said diaphragm, said valve is positioned to activate said switch of said flow detector, whereby said flow detector indicates a flow condition.

14. The leak detector according to claim 11, further comprising:

a magnet attached to said valve, and wherein said switch is a magnetically-actuated switch positioned within said leak detector such that axial movement of said magnet triggers said switch.

15. A leak detector for use with a piping system, said leak detector comprising:

a housing configured to be attached to a conduit;

a valve positioned within said housing, said valve being configured and arranged for axial movement with respect to said housing;

a magnet attached to said valve for movement therewith; and a magnetically-actuated switch positioned within said leak detector along an axial flow path of a fluid such that axial movement of said magnet triggers said magnetically-actuated switch, wherein actuation of said magnetically-actuated switch indicates fluid flow through said leak detector.

16. The leak detector according to claim 15, further comprising a tube secured to said housing, wherein said tube is configured and arranged to isolate said magnetically-actuated switch from the fluid flowing through said leak detector.

17. The leak detector according to claim 16, wherein said tube extends in a generally radial direction within said housing, and the radial position of said magnetically-actuated switch is adjustable with respect to said tube.

* * * * *